July 19, 1960
D. H. EISENLOHR
2,945,897
RECOVERY OF 1,1-DICHLOROETHANE
Filed Oct. 28, 1958
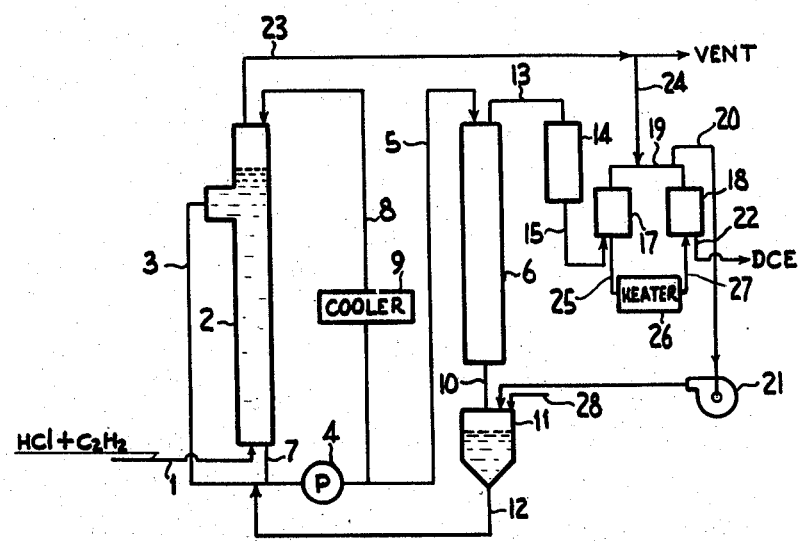
INVENTOR.
DOUGLAS H. EISENLOHR
BY
*Oscar H. Spencer*
ATTORNEY : 2,945,897
Patented July 19, 1960

2,945,897

RECOVERY OF 1,1-DICHLOROETHANE

Douglas H. Eisenlohr, Barberton, Ohio, assignor to Columbia-Southern Chemical Corporation, Allegheny, Pa., a corporation of Delaware Filed Oct. 28, 1958, Ser. No. 770,036

10 Claims. (Cl. 260—663)

The present invention relates to the production of 1,1-dichloroethane and more particularly to a method of recovering 1,1-dichloroethane prepared by catalytically reacting acetylene and HCl in the liquid phase usually in an organic solvent.

By catalytically reacting acetylene and HCl in a liquid organic medium, 1,1-dichloroethane may be prepared. In such a method, 1,1-dichloroethane collects in the liquid medium and as a rule must be separated therefrom. Serious problems are encountered in the recovery.

Thus if recovery of 1,1-dichloroethane from the liquid medium is directly attempted by distillation, product of high purity is not obtained. Moreover, during distillation, solids form apparently due to polymerization, thereby seriously hampering the recovery of product. In addition, the catalyst present in the liquid medium deteriorates so that its reuse for the production of additional 1,1-dichloroethane is not possible. Frequently breakdown of product to vinyl chloride and HCl also occurs.

It has been found according to the present invention that 1,1-dichloroethane may be removed from an organic liquid medium containing catalyst suitable for the reaction of hydrogen chloride and acetylene to produce 1,1-dichloroethane in a high degree of purity and essentially free of catalyst. In addition, the removal of product from the catalyst containing medium may be carried out readily on a continuous basis with solids formation in the liquid medium eliminated or minimized to a great extent. In addition, no breakdown of product takes place during removal. Further, employing the procedures herein described catalyst containing liquids may be utilized again and again after removal of product without detrimental effect on the yield of product or the rate of reactions taking place in the presence of the catalysts.

Thus, according to the present invention, it has been discovered that 1,1-dichloroethane in a non-aqueous liquid medium having metal chloride catalyst therein may be removed free of catalyst contamination by selectively stripping 1,1-dichloroethane from the liquid medium with gaseous HCl as a gaseous mixture of 1,1-dichloroethane and HCl. This gaseous mixture of HCl and 1,1-dichloroethane is then cooled to condense the 1,1-dichloroethane and still maintain HCl in a gaseous state thereby accomplishing a separation of product. Such gaseous HCl may be used to accomplish additional stripping, or as will hereinafter be apparent, may be used for reaction with acetylene to provide additional 1,1-dichloroethane product.

Recovery of 1,1-dichloroethane by this procedure of stripping with gaseous hydrogen chloride is particularly applicable in cooperation with producing continuously 1,1-dichloroethane by the catalytic reaction of hydrogen chloride and acetylene. In a typical performance of the invention, a reactor is charged with a liquid body of 1,1-dichloroethane containing metal chloride catalyst. Hydrogen chloride and acetylene are continuously fed in appropriate proportions to the liquid body and reacted to form 1,1-dichloroethane. Continuously withdrawn from the reactor and stripped with hydrogen chloride gas in a separate zone is a liquid stream having a composition corresponding to the liquid body. The residual stripped liquid is returned to the reactor. In this fashion, and by correlating the rate of removing 1,1-dichloroethane with the rate of its formation in the reactor, it is possible to run the reactor continuously.

Catalysts employed in the production of 1,1-dichloroethane by the process herein described are metal chlorides usually mixtures of metal chlorides such as mercuric chloride and/or a Friedel-Crafts catalyst such as ferric chloride, aluminum chloride, and the like. The quantity of catalytic material employed is considerably variable but generally is from 0.10 to 1.0 percent mercuric chloride by weight and between about 0.5 and 15 percent by weight ferric chloride or aluminum chloride. All weight percentages are based on the total weight of the initial charge of non-aqueous organic solvent used in the reaction zone.

The liquid medium in which the catalyst is carried may be comprised of any substantially inert organic liquid which will effectively be contained in the reaction vessel under reaction conditions and in which the catalysts are only very slightly soluble. Thus, materials such as nitrobenzenes, and normally liquid halogenated hydrocarbons such as 1,1,2-trichloroethane, 1,1-dichloroethane, and other like compounds and mixtures thereof, may be employed. 1,1-dichloroethane has been found particularly effective as a catalyst carrier for this process. Absence of appreciable water or essentially anhydrous conditions is advisable.

The temperatures employed in the preparation of the 1,1-dichloroethane are variable within certain limits. Thus under essentially atmospheric conditions, temperatures may range between about 55° F. to about 80° F.

The gases fed to the reaction zone are proportioned to provide about two moles of HCl per mole of acetylene fed. Excess HCl may be passed to the reactor to insure the addition of two moles of HCl to the acetylene fed. Thus, if excess HCl is added the feed may vary from about 2.1 to about 4 moles of HCl per mole of acetylene fed to the reaction zone. The reaction zone may be utilized as a convenient location for the introduction of the HCl employed in the stripping operation and therefore when so utilized considerable excess HCl is fed to this zone over and above the requirements for the addition reaction between the acetylene feed and HCl. While it is permissible to introduce the stripping HCl to the system in the reaction zone it will of course be understood that it may be introduced with equal facility in other parts of the system.

Usually product removal from the organic catalyst containing liquid is accomplished by employing at least 2 volumes of HCl for each volume of product recovered.

On a weight bases about 2 pounds of HCl per pound of product recovered are employed. Generally it is preferable to operate the HCl flow to the product removal zone in excess of the above values since it may be utilized therein other than as a stripping agent as will hereinafter be more fully explained.

A condenser is conveniently utilized to recover 1,1-dichloroethane from the HCl-1,1-dichloroethane mixture issuing from the product removal zone and is operated with a coolant maintained at temperatures in the range of from 15° F. to 25° F. The gases entering the condenser are usually in the range of from 65° F. to 75° F. and leave the condenser at between 30° F. and 40° F. In any event, operation of the condensing zone is such that the temperature therein is at or below that temperature at which the 1,1-dichloroethane condenses but above the temperature at which gaseous HCl will condense.

Any appropriate vessel may be employed in stripping product. Generally, an unpacked column may be employed satisfactorily or if desired, packed columns may be utilized with equal facility. While preferably the contact of the product carrying organic, catalyst containing, liquid is conducted with the gaseous HCl and the liquid passed countercurrent to each other, unidirectional stripping may also be employed.

Temperatures employed in the stripping zone will vary considerably depending upon the pressure conditions obtaining in the system. Thus at atmospheric conditions of pressure a temperature range of between 60° F. and 95° F. is preferably employed. Generally the temperature employed should be below that at which the 1,1-dichloroethane boils, e.g. 135° F., but high enough to permit recovery of satisfactory quantities of 1,1-dichloroethane from the liquid body. The temperature should thus be high enough to permit a reaction between HCl and acetylene or vinylchloride to take place in the presecne of a metal chloride catalyst. Temperatures maintained within these limits provide an effluent stream from the stripping zone containing between 10 and 90 percent 1,1-dichloroethane by volume.

For a more complete understanding of the instant invention, reference is made to the accompanying drawing, which shows diagrammatically one suitable arrangement of apparatus for accomplishing the process of the instant invention.

Thus, in the figure there is shown a reactor 2 having a gaseous feed inlet 1 for the introduction of HCl and acetylene and a product discharge line 3. Discharge line 3 has a pump 4 associated therewith to accomplish circulation of product from reactor 1 to stripping column 6. A discharge line 7 is located on the bottom of the reactor 2 and is equipped with a valve (not shown), line 7 being in communication with discharge line 3. A line 8 is tapped off the discharge line 3 and also is provided with a valve not shown. The line 8 has a heat exchanger 9 located therein. The line 8 terminates at the upper portion of the reactor 2.

A gaseous discharge line 23 is located at the top of reactor 2 and by manipulation of valves not shown may communicate with line 24 or vent to the atmosphere.

Stripper 6 is provided with a gas outlet 13, a gas inlet and liquid outlet conduit 10 and a liquid inlet 5. The combination gas inlet and liquid outlet conduit 10 communicates with a cone tank 11 which is equipped at its lower end with a discharge line 12 which communicates with line 3. The product outlet line 13 passes to a condenser 14. A conduit 15 located at the bottom of condenser 14 communicates with two phase separator 17 and 18. Gaseous discharge lines from 17 and 22 form conduit 19 which communicates with gas circulation conduit 20 and blower 21. Conduits 25 and 27 permit circulation between units 17 and 18 through a heater 26. A liquid product discharge line 22 is located in the bottom of separator 18.

In a typical operation of the system shown in the drawing reactor 2 is charged with a quantity of 1,1-dichloroethane containing therein a mercuric chloride-ferric chloride catalyst. Reactor 2 is filled with this liquid to a point slightly below the level of discharge line 3. Gaseous HCl and acetylene after drying are fed to the bottom of the reaction zone in reactor 2 through line 1. The proportion of feed materials is such that about 2 moles of HCl for each mole of acetylene fed are employed and in addition excess HCl sufficient to accomplish stripping of 1,1-dichloroethane product is also introduced through feed line 1 to the reaction system.

As the addition reaction between acetylene and HCl takes place the volume of 1,1-dichloroethane within reactor 2 increases proportionately and the liquid level gradually rises to the level of line 3. At this point and with the aid of pump 4 liquid product containing some catalyst therein is fed through line 3 and 5 to the top of the stripper 6. In addition excess HCl fed to reactor 2 exits therefrom through conduit 23. Blower 21 is started and the HCl gas in line 23 is circulated successively through lines 24, 19 and 20 into the top of cone tank 11 and through line 10 to the bottom of the stripper 6.

Either continuously or on an intermittent basis as required by conditions liquid from reactor 2 is removed through line 7 by opening a valve, not shown, therein. Utilizing pump 4 and opening another valve, not shown, in line 8 liquid discharged through line 7 is sent through cooler 9 where its temperature is lowered and the liquid is then sent back to the reactor 2 through line 8. This side circulation stream of the reaction zone liquid permits a close control of reaction zone temperatures so that they are at all times maintained within the desired limits.

The liquid from reactor 2 which enters the stripper 6 is passed preferably countercurrent to the gaseous HCl entering the bottom of the stripper. The HCl effectively strips a portion of the 1,1-dichloroethane from the liquid it contacts during its passage through the stripping zone and a gaseous mixture of 1,1-dichloroethane and HCl pass out of the stripping zone through line 13 into a condenser 14. In the condensing zone within the condenser the gaseous mixture is cooled to a temperature sufficient to liquefy the 1,1-dichloroethane product while maintaining the HCl portion of the mixture in the gaseous state.

The gas-liquid mixture is then passed to phase separator 17. In the preferred embodiment shown in the drawing 2 phase separators in series are employed though one or more than two may be employed if desired. Gaseous HCl escapes from separator 17 through line 19 and into line 20 where it is recirculated to the stripper as described above. Organic liquid is circulated from separator 17 through line 25 to heater 26 and then by line 27 to a second separator 18. This heating and circulation step is designed to eliminate any residue HCl that may still be present in the liquid material removed from separator 17. Any residual HCl gas is removed from the top of separator 22 through lines 19 and 20 and is recirculated to the stripper 6 as previously described. Substantially catalyst free 1,1-dichloroethane is removed from separator 18 through line 22 where it is passed to storage or otherwise utilized. Residual liquid material containing catalyst therein after contact with HCl in the stripper 6 collects in cone tank 11 from which it is recycled to the reactor 2. This recycle is accomplished by sending the liquid through conduit 12 to conduit 3. From line 3 the material may be introduced into the reactor through line 7 or line 8 or through both as desired.

While in this embodiment the feed line 1 was utilized to introduce the stripping HCl, it is to be understood that other portions of the system may be utilized for this HCl introduction. Thus, if desired, an inlet could be provided in line 20 or line 10 for example without detrimental effect. In a preferred embodiment a line 28 is provided in the cone tank for this HCl addition. It is possible to conduce the reaction of HCl and acetylene and the stripping of 1,1-dichloroethane in the same zone but superior results are achieved when a separate stripping zone is employed. The HCl stripping gas present in the stripping zone in addition to accomplishing a stripping of product effectively reacts with any vinyl chloride that may be present in the liquid entering the stripper to produce 1,1-dichloroethane. Thus, while functioning as a stripping zone primarily the stripper may be utilized as a clean up vessel for any vinyl chloride present in the product streams of the reactor.

As will be readily apparent, operation in accordance with this invention permits the continuous reuse of catalyst in reactor 2 since all catalytic materials removed with product through line 3 and introduced into the stripper are returned to the reactor from the cone tank 11 through line 12. The product removed through line 13 of the stripping column and the HCl gas stream is found to be free of catalyst and of a high degree of purity, and may be suitably employed as recovered.

The following specific example is illustrative of the method employed in recovering 1,1-dichloroethane from a catalyst containing non-aqueous liquid phase.

EXAMPLE

The reactor system employed was essentially the same as appears in the accompanying drawing. Reactor 2 was a glass reactor 6 inches in diameter and 10 feet in height. One hundred fifty pounds of 1,1-dichloroethane containing therein 1.67 percent by weight ferric chloride and 0.5 percent mercuric chloride by weight was charged to the reactor. Reactor 2 was operated under substantially atmospheric conditions and the temperature maintained in the liquid during operation at between 60° F. and 75° F. Stripping column 6 employed was a 6 inch diameter glass column 4 feet in height and packed with ½ inch ceramic rings. Stripping column internal temperatures ranged between 65° F. and 80° F. HCl and acetylene were fed to reactor 2 at a substantially uniform rate and were regulated so as to provide about 2 moles of HCl for each mole of acetylene fed to the reactor. Circulation from the reactor through the stripping column of the 1,1-dichloroethane containing catalyst material was such that the 300 pounds per hour of the reaction medium containing catalyst as well as 1,1-dichloroethane were fed to the stripping column and contacted with 25 pounds of gaseous HCl per hour. The HCl for stripping was introduced into the top of cone tank 11 through line 28 and was continually recycled via lines 13, 15, 19 and 20 to the cone tank. HCl was added periodically to maintain the 25 pounds per hour flow through the stripper. 1,1-dichloroethane was removed by the gaseous HCl from the stripping column through line 13 on the average of 9 pounds per hour. The condenser 14 was a steel jacketed condenser having brine circulating throughout the jacket, the brine entered the condenser at 20° F. and exited at 28° F. The gases entering the condensing system through line 13 entered the condenser at about 70° F. and exited at 35° F.

Liquid product 1,1-dichloroethane was collected in phase separators 17 and 18 and removed from the system through line 22. The heater placed between the phase separators was operated at 95° F. while product was circulated from 17 to 18.

Several extended runs were made over a period of several days. Ferric chloride was added as needed during the runs. The results of these runs are shown in Table I.

*Table I*

| Run | Hours Operation Per Run | $FeCl_3$ Pounds | $HgCl_2$ Pounds | Feed Ratio | | Product, Pounds |
|---|---|---|---|---|---|---|
| | | | | HCl, Pounds | $C_2H_2$, Pounds | |
| 1 | 11.5 | 3.0 | 0.75 | 106 | 36.5 | 56 |
| 2 | 13.5 | | | 123 | 40.5 | 60 |
| 3 | 14.5 | 0.5 | | 168 | 51.5 | 102 |
| 4 | 20.7 | 1.0 | | 127 | 39.5 | 115 |
| 5 | 19.0 | 1.0 | | 132 | 45.5 | 140 |
| 6 | 15.3 | 1.0 | | 100 | 30.0 | 111 |
| 7 | 20.2 | 2.0 | | 181 | 65.8 | 223 |
| 8 | 17.8 | 2.0 | | 142 | 50.8 | 180 |
| 9 | 13.0 | | | 78 | 46.5 | 127 |
| 10 | 17.3 | 2.0 | | 125 | 56.0 | 152 |
| 11 | 17.8 | 1.0 | | 135 | 59.2 | 189 |
| 12 | 22.6 | 1.0 | | 143 | 69.0 | 217 |
| 13 | 20.7 | 1.0 | | 132 | 65.0 | 211 |
| 14 | 22.3 | | | 146 | 67.8 | 203 |
| Total | 246.5 | 15.5 | 0.75 | 2,119 | 723.6 | 2,186 |

As can be readily seen from the accompanying table, effective removal of product was obtained. The product recovered was found to contain no catalyst and was satisfactory for use in a photochlorination operation to produce methyl chloroform by reacting 1,1-dichloroethane product with chlorine in the presence of light.

While the invention has been described with reference to certain specific examples, it is not intended that the invention be so limited except insofar as appears in the accompanying claims.

I claim:

1. A method of recovering 1,1-dichloroethane from an organic liquid medium containing metal chloride comprising stripping said medium with gaseous HCl to thereby obtain a gaseous mixture of 1,1-dichloroethane and hydrogen chloride and condensing 1,1-dichloroethane.

2. A method of recovering 1,1-dichloroethane from a non-aqueous catalyst containing liquid medium comprising passing gaseous HCl through said medium to thereby strip a portion of the 1,1-dichloroethane therefrom, removing the 1,1-dichloroethane containing HCl from said medium and condensing the 1,1-dichloroethane from the HCl gas stream.

3. A method of recovering 1,1-dichloroethane from a non-aqueous catalyst containing liquid medium comprising passing gaseous HCl through said medium to strip a portion of the 1,1-dichloroethane therefrom, removing the 1,1-dichloroethane containing HCl from said medium, condensing 1,1-dichloroethane contained in the HCl and recycling the HCl to the non-aqueous liquid medium to strip an additional 1,1-dichloroethane therefrom.

4. The method according to claim 1 wherein the amount of HCl fed to the non-aqueous catalyst containing liquid medium is at least 2 moles of HCl per mole of product removed therefrom.

5. A method of preparing 1,1-dichloroethane which comprises feeding hydrogen chloride and acetylene to a liquid organic body containing metal chloride catalyst therein, reacting hydrogen chloride and acetylene in said body to form 1,1-dichloroethane therein, and recovering 1,1-dichloroethane product therefrom by stripping said body containing 1,1-dichloroethane with gaseous HCl to remove 1,1-dichloroethane.

6. A method of recovering 1,1-dichloroethane from a non-aqueous liquid medium containing ferric chloride-mercuric chloride comprising passing gaseous HCl through said medium to remove 1,1-dichloroethane from said medium as a gaseous mixture of HCl and 1,1-dichloroethane, selectively condensing 1,1-dichloroethane from the gaseous mixture and employing uncondensed HCl to remove additional 1,1-dichloroethane from the medium.

7. A method of recovering 1,1-dichloroethane from an organic liquid medium containing ferric chloride-mercuric chloride catalyst comprising, stripping said medium with gaseous HCl to obtain a gaseous mixture of 1,1-dichloroethane and HCl and condensing 1,1-dichloroethane from said mixture.

8. In a continuous process for the preparation of 1,1-dichloroethane comprising reacting hydrogen chloride and acetylene in an organic liquid medium containing a metal chloride catalyst and collecting 1,1-dichloroethane produced in said medium the improvement comprising continuously withdrawing a liquid stream from said organic liquid medium, continuously contacting said stream with gaseous hydrogen chloride to produce a gaseous mixture of hydrogen chloride and 1,1-dichloroethane, continuously removing said mixture from the stream, selectively condensing 1,1-dichloroethane from said mixture and continuously contacting at least a portion of the remaining gaseous hydrogen chloride with said stream.

9. The method of claim 8 wherein at least a portion of the gaseous hydrogen chloride remaining after the selective condensation step is fed to the organic liquid medium.

10. In the process of preparing 1,1-dichloroethane in a liquid reaction medium containing metal chloride catalyst by reaction of HCl and acetylene at temperature of below 80° F., the improvement which comprises recovering 1,1-dichloroethane from the medium while it is below 135° F. by passing gaseous HCl through the medium to remove 1,1-dichloroethane therefrom as a gaseous mixture of HCl and 1,1-dichloroethane.

References Cited in the file of this patent
UNITED STATES PATENTS

| | | |
|---|---|---|
| 2,434,094 | Axe | Jan. 6, 1948 |
| 2,522,687 | Padgitt et al. | Sept. 19, 1950 |
| 2,858,347 | Hutchings | Oct. 28, 1958 |

UNITED STATES PATENT OFFICE
CERTIFICATION OF CORRECTION

Patent No. 2,945,897                      July 19, 1960

Douglas H. Eisenlohr

It is hereby certified that error appears in the above numbered patent requiring correction and that the said Letters Patent should read as corrected below.

Column 3, lines 24 and 25, for "strippring" read -- stripping --; lines 36 and 37, for "presecne" read -- presence --; column 6, line 50, strike out "an".

Signed and sealed this 20th day of June 1961.

(SEAL)
Attest:

ERNEST W. SWIDER                              DAVID L. LADD
Attesting Officer                               Commissioner of Patents